US007172052B2

(12) United States Patent
Lenhard-Backhaus

(10) Patent No.: US 7,172,052 B2
(45) **Date of Patent: *Feb. 6, 2007**

(54) HEADPHONE

(75) Inventor: Hugo Lenhard-Backhaus, Vienna (AT)

(73) Assignee: AKG Acoustics GmbH, Vienna (AT)

( * ) Notice: Subject to any disclaimer, the term of this patent is extended or adjusted under 35 U.S.C. 154(b) by 382 days.

This patent is subject to a terminal disclaimer.

(21) Appl. No.: 10/768,703

(22) Filed: Jan. 29, 2004

(65) Prior Publication Data

US 2004/0216946 A1 Nov. 4, 2004

(30) Foreign Application Priority Data

Jan. 31, 2003 (AT) .............................. A 153/2003

(51) Int. Cl.
*G02C 11/06* (2006.01)
*H04R 25/00* (2006.01)
*H04R 25/04* (2006.01)

(52) U.S. Cl. ...................... 181/129; 381/383; 381/378; 381/370; 381/374

(58) Field of Classification Search ................ 181/129, 181/128, 137, 130, 135; 381/383, 378, 370, 381/374; 2/423, 209; 379/430
See application file for complete search history.

(56) References Cited

U.S. PATENT DOCUMENTS

| | | | | |
|---|---|---|---|---|
| 1,503,908 | A * | 8/1924 | Manson | 381/378 |
| 1,513,924 | A * | 11/1924 | Murdock | 381/379 |
| 1,579,412 | A * | 4/1926 | Stemberg | 381/378 |
| 1,592,978 | A * | 7/1926 | Kaisling, Jr. | 381/378 |
| 1,651,623 | A * | 12/1927 | Obergfell | 381/378 |
| 3,272,926 | A * | 9/1966 | Falkenberg | 381/372 |
| 4,409,442 | A * | 10/1983 | Kamimura | 381/383 |
| 5,117,464 | A | 5/1992 | Jones et al. | |
| 5,185,807 | A * | 2/1993 | Bergin et al. | 381/378 |
| 5,293,647 | A * | 3/1994 | Mirmilshteyn et al. | 2/209 |
| 5,809,574 | A * | 9/1998 | Falco et al. | 2/209 |
| 5,983,399 | A * | 11/1999 | Falco et al. | 2/209 |
| 6,081,604 | A * | 6/2000 | Hikichi et al. | 381/371 |
| 6,629,579 | B1* | 10/2003 | Hasegawa | 181/129 |
| 2004/0213428 | A1* | 10/2004 | Lenhard-Backhaus | 381/370 |
| 2006/0062417 | A1* | 3/2006 | Tachikawa | 381/378 |

FOREIGN PATENT DOCUMENTS

| | | |
|---|---|---|
| DE | 25 40 839 | 4/1976 |
| DE | 26 42 786 | 4/1978 |
| DE | 32 25 812 | 2/1983 |
| EP | 0 994 636 | 4/2000 |
| JP | 101 74 187 | 6/1998 |

* cited by examiner

*Primary Examiner*—Edgardo San Martin
(74) *Attorney, Agent, or Firm*—Friedrich Kueffner

(57) ABSTRACT

A headphone has a headband and two earpieces each connected to the headband so as to be pivotable about at least two pivot axes. The two pivot axes intersect one another at a point of intersection that is positioned on or near a central axis of the earpiece, respectively. Arms connect the earpieces to the headband, wherein the arms define a first one of the two pivot axes, respectively. A second one of the two pivot axes is fixedly arranged on the headband, respectively. In this way, the earpieces are rotatable about the arms and the arms are rotatable relative to the headband about the second pivot axes.

8 Claims, 6 Drawing Sheets

HEADPHONE

BACKGROUND OF THE INVENTION

1. Field of the Invention

The invention relates to a headphone comprising a headband and two earpieces. The invention concerns, in particular, the adjustment of the headphone earpieces to different head shapes of users and the possibility of folding the headphone when not in use to a compact size.

2. Description of the Related Art

Headphones are known in several configurations and variants. For the present invention, the construction and support of the transducer is not important; only the mechanical connection and configuration of the earpieces and of the headband are of interest.

Headphone bands are known in various designs. For example, a headphone headband is disclosed in Austrian patent 370 581 B1 that is configured like lazy tongs and therefore provides a significant reduction in size of the entire headphone when not in use. The earpieces are connected to the headband by pseudo-spherical suspension means that allow only a minimal adaptation to different head shapes. As a result of the construction of the headband as lazy tongs it is required to guide the cable so that it is exposed and the wires must be secured by holes in the segments of the lazy tongs. As mentioned above, this configuration does not provide excellent comfort of wear but provides with a simple configuration an acceptable solution even when no great reduction in size is available in the folded state.

Austrian patent 370 275 B discloses a headband of a headphone that can telescope on a circular path and is adjustable to different head sizes in this way. This prior art reference is silent in regard to details of the suspension of the earpieces; also, there is no disclosure in regard to a possible reduction in size of the headphone when not in use. This prior art reference concerns only the adaptation of the headband to different head sizes.

Austrian patent 338 530 B discloses a headphone that is provided with an elastic strap in the area of the headband so that the adaptation to .different head sizes is achieved without the headband itself undergoing any change. The type of mounting of the earpieces on the headband is not disclosed, and the drawings are only schematic in this respect. This prior art reference therefore does only concern the adaptation of the headphone to different head shapes not the reduction in size of the headphone when not in use. The same holds true for the headphones disclosed in Austrian patents 326 743 B and 313 392 B.

Headphones that deal with the adaptation of the orientation and position of the earpieces to different head shapes of the user are described, for example, in Austrian patent 368 823 B. Each one of the earpieces is mounted on an elastic strap that is tightened as a chord on the headphone band and enables a size adjustment by movement along the headband and an adaptation to the shape of the head by positioning the earpieces at the connecting point in an inclined position. The inclined position of the earpieces on the tightened band introduces forces into the earpieces that cause a tilting movement of the earpieces on the head, and therefore only minimal comfort is provided despite an excellent geometric adaptation of the earpieces.

The Austrian patent 297 111 B discloses a multi-part headphone headband with hinges that connect the individual parts and enables in this way a better adaptation to the head shape; this disclosure does not explicitly concern foldable headphones.

An adaptation to different head shapes and head sizes is also disclosed in Austrian patent 217 105 B. A springy head band is disclosed that is provided at both ends with straight portions where the earpieces are slidably arranged. An additional movability of the earpieces relative to the headband is not disclosed.

Austrian patent 321 388 B discloses a headphone where the earpieces are pivotable relative to the headband about axes that are perpendicular to a plane extending through the headband and, in this way, can be adjusted to a slanted position of the ears or the contact surfaces of the earpieces on the widest location of the head relative to the narrowing chin. Additional springy elements are provided that further increase the comfort of wear of the headphone. Neither an adaptation to the head shape that generally narrows in the forward direction is described nor folding of the headphone when not in use.

Austrian patent 276 516 B discloses a foldable headphone where the headband is comprised of at least three parts that can be pivoted about axes that extend perpendicularly to the plane of the headband into a parallel position to one another, wherein either the earpieces are designed such that they are not wider than the headband or the earpieces are pivotable about axes that extend parallel to the edge portions of the headband so that they can be pivoted into this plane.

Also, headphones are known where each earpiece is pivotable about an axis extending approximately horizontally when the headphone is in the proper position of use and the head of the user is in the normal upright position. These axes are provided on an arc-shaped bracket that is also horizontally positioned and is rotatable about a substantially vertical axis that is located at the apex of the bracket and is mounted on the headband of the headphone and forms essentially an extension of the end area of the headphone. This so-called cardanic mechanism provides very high comfort of wear but requires an extremely large amount of space and is counterproductive with regard to any reduction in size of the headphone when removed from the head of the user.

SUMMARY OF THE INVENTION

It is an object of the present invention to provide a headphone having high comfort of wear and having a suspension of the earpieces that requires only minimal space and is not contradictory to the goal of reduction in size of the headphone when not in use. Also, the invention relates to the reduction in size of the headphone when removed from the head without impairing the comfort of wear in any way but instead improving comfort of wear, if possible.

In accordance with the present invention, this is achieved in that each earpiece of the headphone is connected in a pivotable way to the headband so as to be pivotable about at least two axes wherein the two pivot axes intersect one another and the point of intersection is positioned on the central axis of the earpiece.

Even in the case of very individually designed headphones, the earpieces of the headphone are provided with a circular or oval cross-section in the area of the contact surface with the human ear and therefore have a so-called central axis that extends perpendicularly to this central contact surface; in most cases, this central axis is also an axis of symmetry at least for the most important elements of the earpieces. In the case of extremely unusually configured cross-sections and contact surfaces of the headphone, the center of gravity of this contact surface can be viewed as a foot point or penetration point of the central axis of the contact surface.

In a particular configuration, the pivot axes intersect approximately the central axis in the area of the point of penetration of the central axis through the central contact surface of the headphone.

In another configuration, the two pivot axes have an angle of 5° to 75°, preferably of 10° to 20°, even more preferred of approximately 15°, relative to one another.

The objects according to the invention are solved, in particular, in that—based on a Cartesian coordinate system whose Z plane represents the symmetry plane of the headphone, whose Y plane is the plane that extends perpendicularly thereto and through the center of the headphone band, and whose X plane is a plane positioned perpendicularly relative to both above defined planes at any desired height—a pivot axis is provided between the headphone band and the optionally pivotable suspension of each earpiece and the pivot axis is positioned relative to each one of the three planes at an angle of at least 10°, preferably of at least 15°. With this configuration, it is achieved in a surprising way that, independent of the further configuration of the suspension of the earpiece, it is always possible to rotate the earpiece relative to the plane of the headband, i.e., the Y plane, such that the earpieces with their largest dimensions are located approximately parallel to and essentially within this plane so that a particularly compact folding position of the headphone when not in use is possible.

According to a preferred configuration, the pivot axis is positioned relative to at least two of the three planes at an angle of at least 20°, preferably of 25°. In this way, a particularly compact configuration of the joint that embodies the pivot axis is provided.

In another configuration of the invention, it is provided that the two pivot axes of the two earpieces can be brought into a congruent position by rotation about 180° about the intersecting line of the Z plane and the Y plane (Z axis). In this way, the earpieces are positioned with their contact surfaces so as to be oriented toward one another and the folded headphone is of a particularly compact size.

DESCRIPTION OF THE PREFERRED EMBODIMENTS

Figure 1:
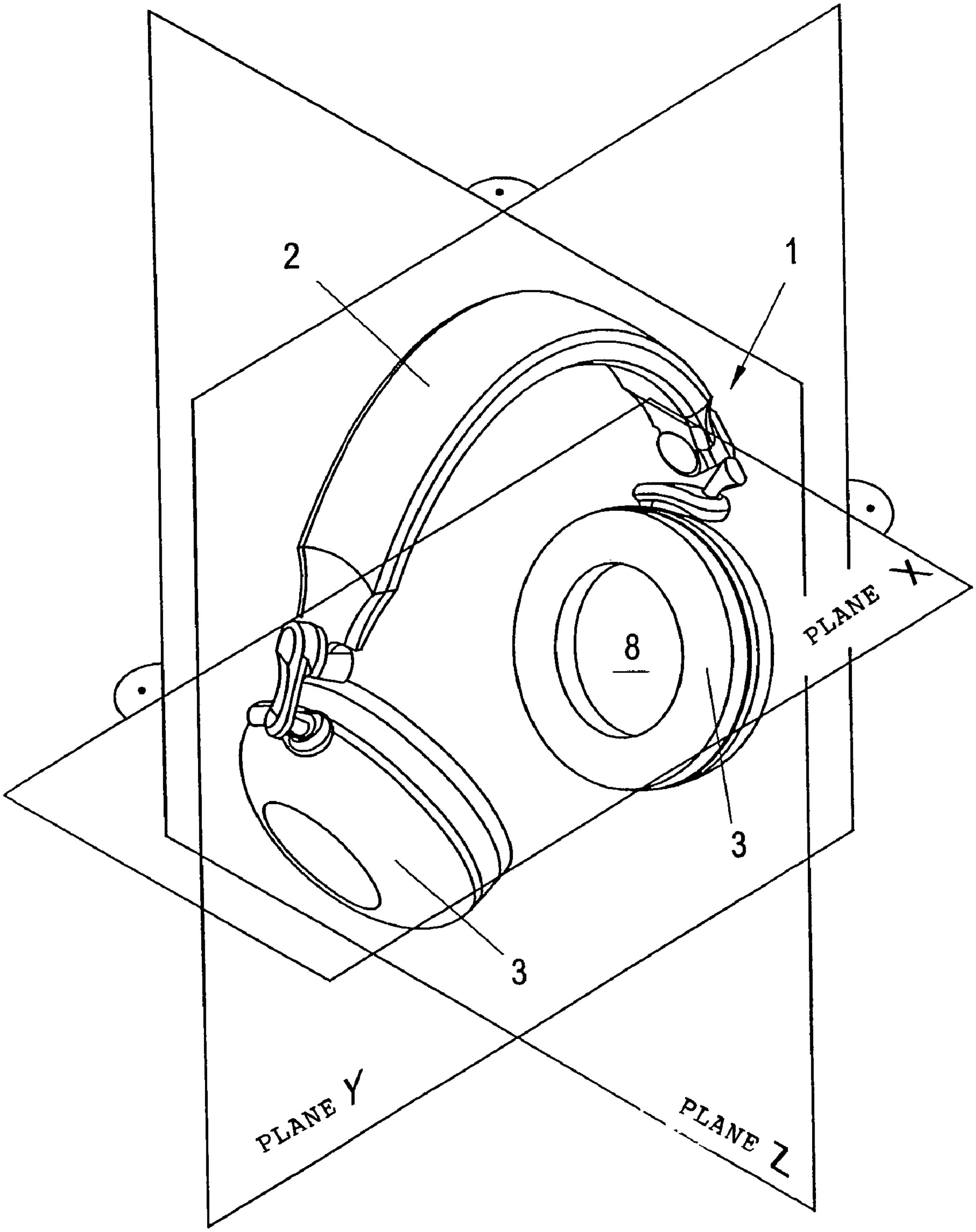
FIG. 1 shows the headphone according to the invention purely schematically with important reference planes being shown.

FIG. 1 shows a headphone according to the invention identified in its entirety by reference numeral 1. The headphone is comprised essentially of a headband 2 and two earpieces 3, not specified in more detail. The transition between the headband 2 and the earpieces 3, as mentioned above, can be realized in many ways; in the following, a particularly preferred configuration according to the invention will be explained.

Figure 2:
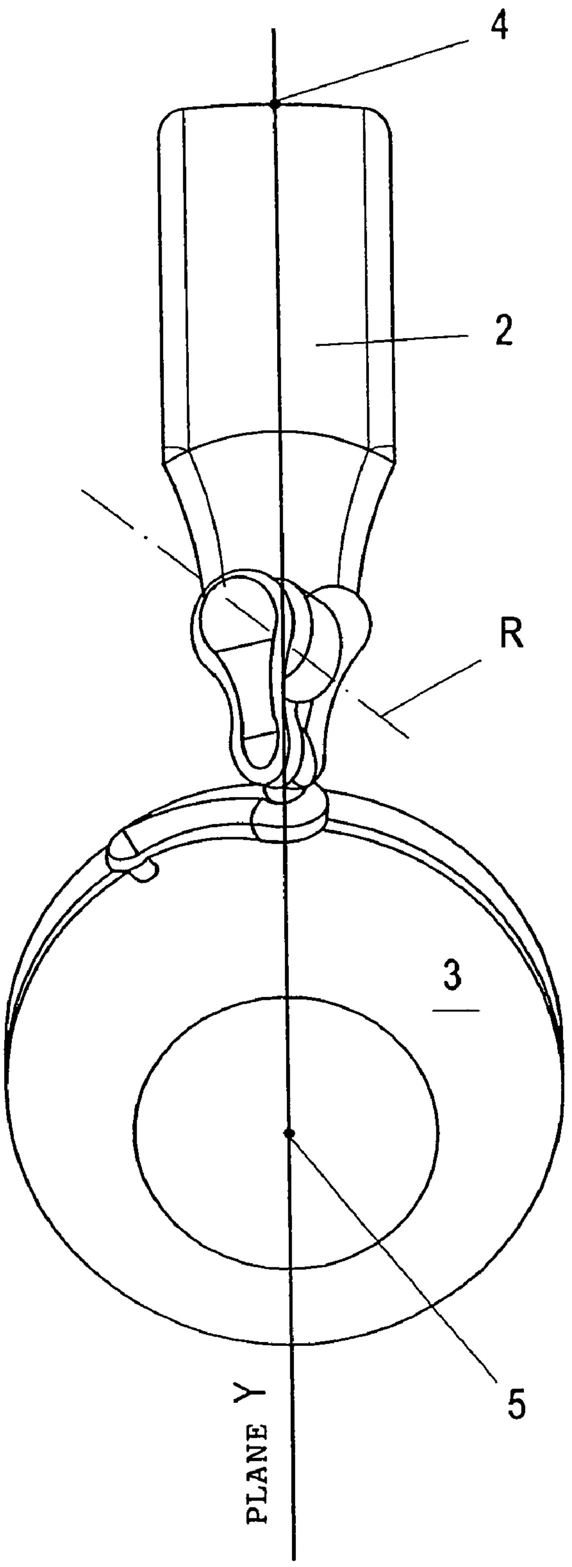
FIG. 2 is an illustration perpendicularly to the Z plane.

First, by means of the perspective view of FIG. 1, the reference system relative to which the position of the different pivot axes is defined will be explained in more detail. The axis of symmetry of the headphone is referred to as the Z plane and is illustrated as such in the drawing. Perpendicularly positioned to the Z plane and extending only through the center of the head band 2, the Y plane is defined, as illustrated in FIG. 2 in more detail. The X plane positioned perpendicularly relative to both aforementioned planes can be positioned at any desired level and is required only for the definition of the angles between the X plane and the pivot axes. In FIG. 1, these three planes are illustrated but not the axes of the orthogonal coordinate system that results therefrom because the axes are of significantly less importance with regard to the present invention in comparison to the planes.

The determination of the position of the plane Z is possible without a problem; on the other hand, the position of the plane Y, as illustrated in FIG. 2, can result in definition problems for headphones of very unusual configurations because there exist headphones whose headbands do not define a center plane in an unequivocal way in contrast to the case of the illustrated headphone. However, since all headphones that are designed to provide a significant comfort of wear have the center 4 of the apex of the headband and the center (center of gravity) of the earpieces 3 (in an extreme design situation, the center of gravity of the contact surface of the earpiece on the head that is assumed to be planar) arranged within very narrow tolerances, the plane Y can be found and determined within narrow limits even in situations of headphones that have a very individual or unusual design.

When these two planes have been found, the X plane can be selected at any desired level or height; its orientation is already predetermined. In the illustrated embodiment, the X plane is positioned in the central area of the joint construction 6, i.e., the entirety of the construction that connects the headband 2 to the earpieces 3.

Figure 4:
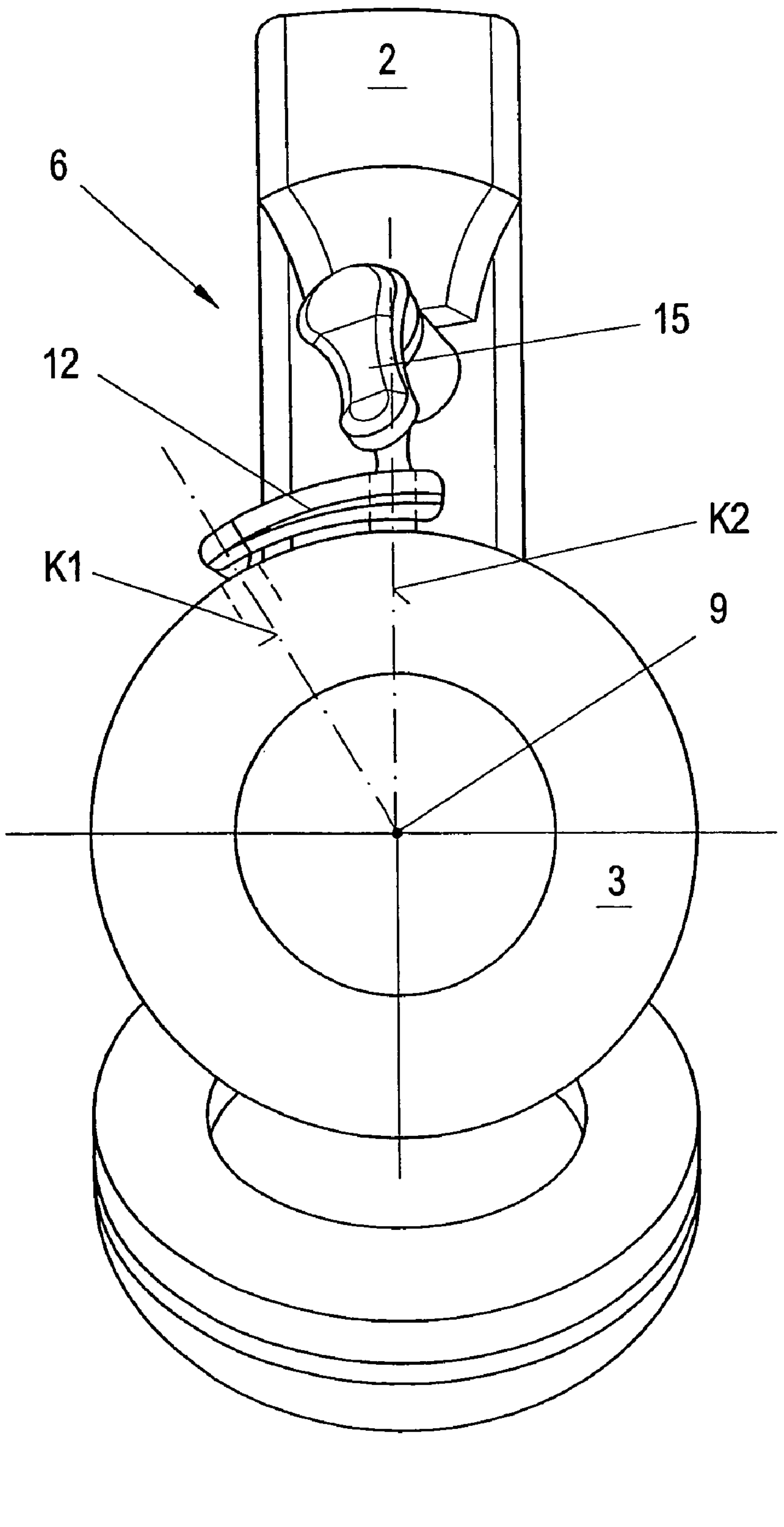
FIG. 4 is a view in the direction of arrow IV of FIG. 3.

FIG. 1, and in particular FIG. 4, show that in the illustrated embodiment the earpieces 3 have a circular configuration of the contact surface 7 as well as of the inner loudspeaker surface 8. This is not necessary; in the case of very unusually shaped earpieces, it is required for determining the correlations according to the invention to use corresponding equivalent parameters. Suitable for this purpose is the best possible approximation of the contact surface 7 to a plane and the substitution of the center 9 of the circle of FIG. 4 by the center of gravity of the planar substitution contact surface. In this way, it is possible to define a central axis 10 even for very unusually designed earpieces.

According to the invention, the pivot axes K1 and K2 designed in order to provide an excellent comfort of wear are arranged as follows relative to the reference planes. The earpiece 3 is rotatable about a pivot axis K1 of an arm 12. The arm 12, in turn, is rotatable about a pivot axis K2 of the headband 2. The pivot axis K2, as shown in the illustrated embodiment, can be arranged on a support arm 15 of the headband 2 that, for the purpose of adaptation to the head shape of the user, is to be understood to be connected fixedly to the headband even though, as explained in the following, it can be pivotable relative to the headband.

Figure 3:
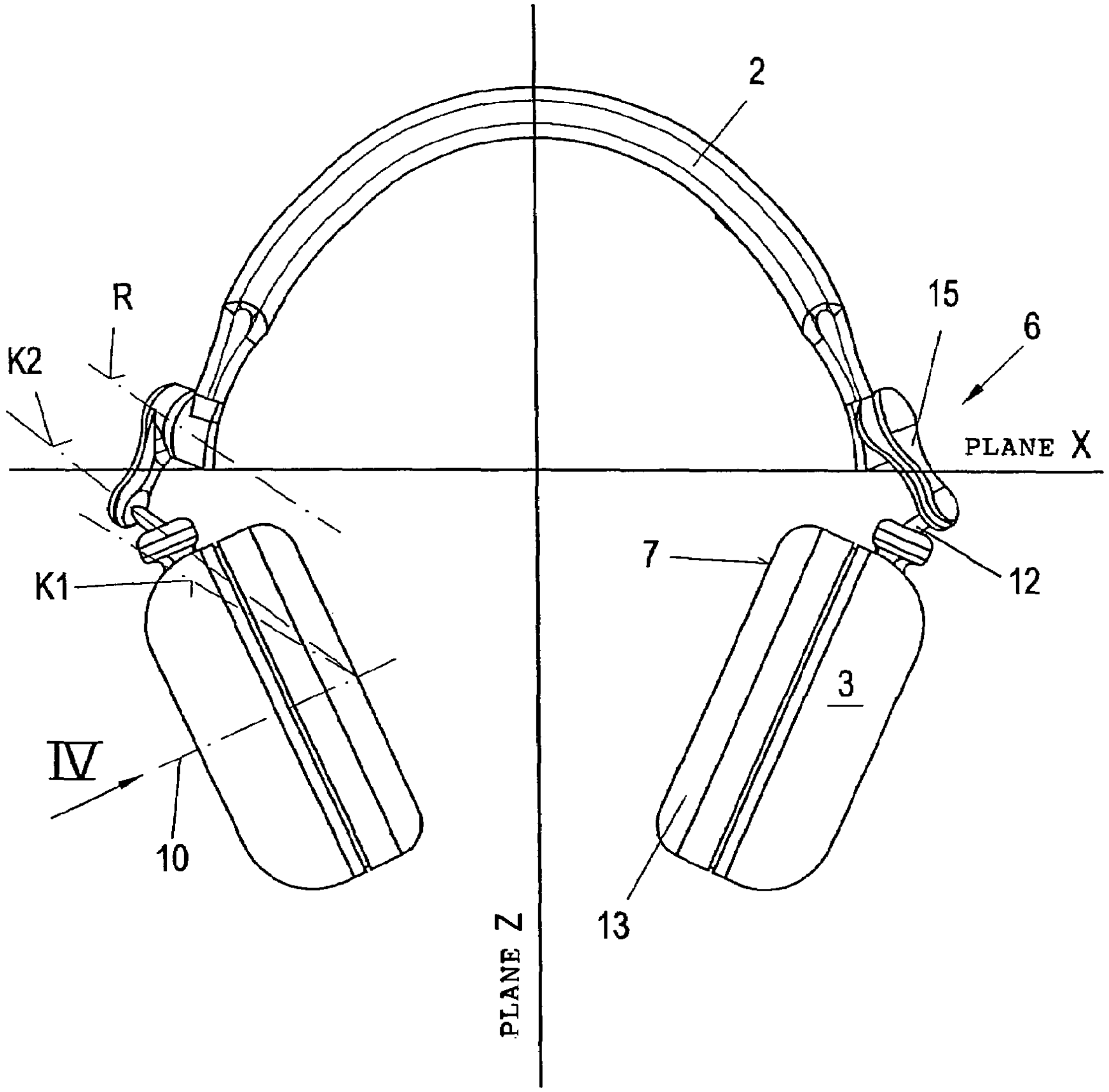
FIG. 3 is an illustration perpendicularly to the Y plane.

The two pivot axes K1, K2 intersect one another, as can be seen when comparing FIGS. 3 and 4, on the central axis 10 of the earpiece 3, preferably in the area of the contact surface 7. In this way, while requiring minimal space, the design ensures that the contact of the earpiece 3 on the head of the user effected by the springy elasticity of the headband 2 is realized substantially without any moment independent of the head shape of the user; in this way, the headphone provides highest comfort.

It is also possible to deviate from the ideal point of intersection illustrated in FIG. 3, for example, by moving it along the central axis 10 or by displacement of the point of intersection away from the central axis 10. However, all of these deviations, inasmuch as they exceed very minimal distances, result in a significant deterioration of the comfort of wear. Only with an extremely soft and thick padding 13 of the earpiece 3 is it possible to move the point of intersection on the central axis somewhat away from the contact plane 7 in the direction toward the center of the headphone, toward the plane 8 of the loudspeaker (FIG. 1), in order to take into account compression and thus deformation of the support 13. In this way, when using the headphone the point of intersection is moved again as precisely as possible into the real contact plane.

It is also possible to not intersect the pivot axes K1, K2 but to allow them to pass one another narrowly; however, as in the above described situation of displacement of the point of intersection, this causes a reduction of the comfort of wear and is thus also to be viewed as detrimental. For this reason, it is desirable to achieve the above mentioned constellation of the point of intersection within the boundaries of the manufacturing tolerances.

According to the invention, a folding action is considered for reducing the headphone in size to the smallest possible space when not in use. For this purpose, an axis R in space is provided (FIGS. 2 and 3) about which folding is carried out; this axis is positioned relative to each of the three defined reference planes at an angle of at least 10°, preferably of at least 15°. Independent of the suspension of the earpieces on the headband, i.e., also in the case of earpiece suspensions that do not correspond to the above defined invention, it is therefore possible to rotate the headphone with its contact planes 7 substantially parallel to the Y plane (plane of illustration of FIG. 3) and, in this connection, depending on the size of the headband 2 and of the earpieces 3, to arrange them adjacent to one another or "stacked" on one another with essentially aligned central axis 10 and to provide in this way a particularly compact shape of the headphone when not in use.

Figure 5:
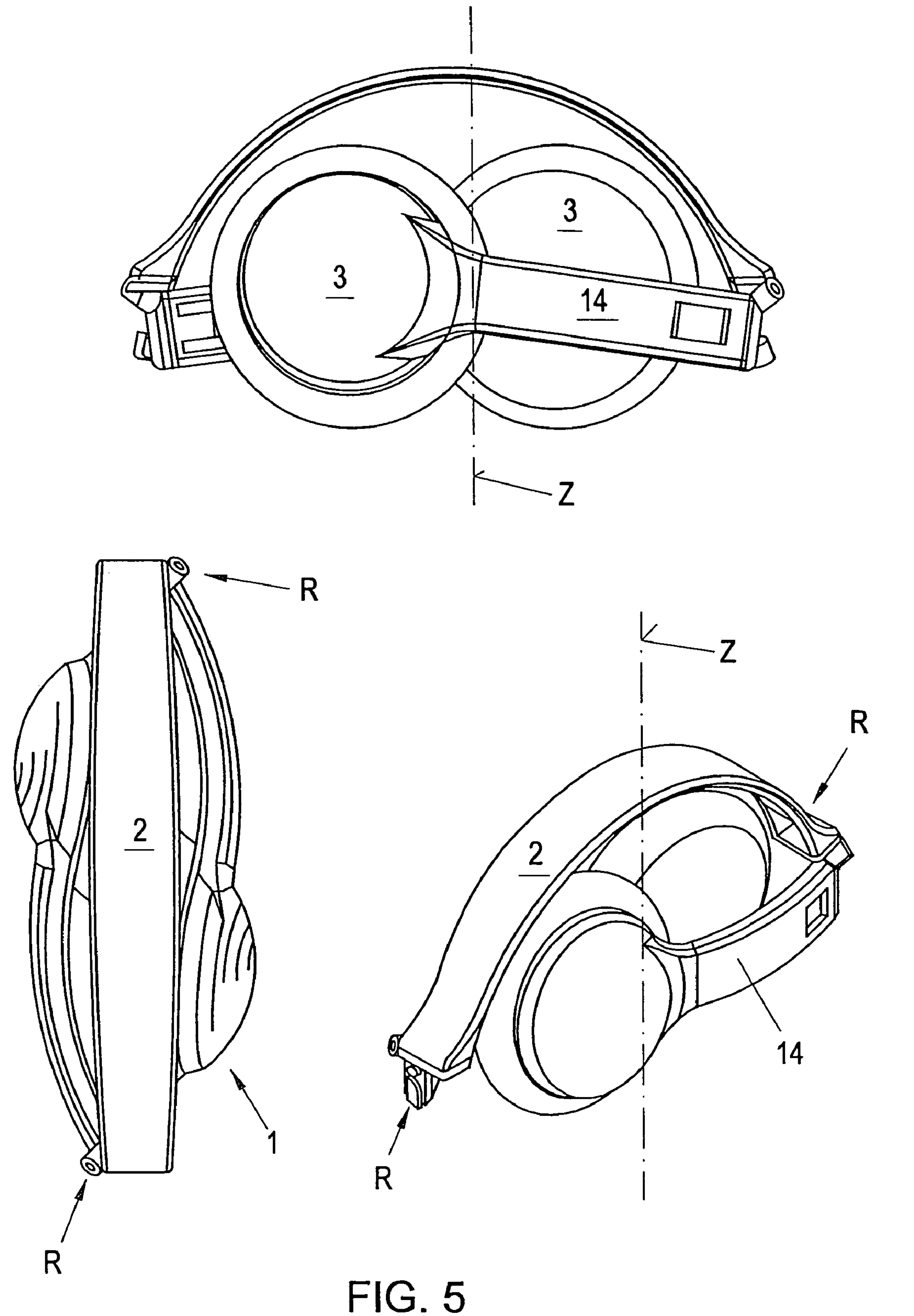
FIG. 5 shows the folded headphone in three different views.

FIG. 5 shows in three views a headphone 1 that is folded in accordance with the present invention. Earpieces 3 are attached by means of simple elastic arms 14 on the headband 2. Between the headband and each one of these arms a pivot axis R is provided that fulfills the above listed requirements with regard to its position in space. The two pivot axes are not symmetrical relative to the Z plane (FIG. 1) but centrally symmetrical relative to the Z axis, i.e., one of the two pivot axes R is arranged "in front of" and the other "behind" the Y plane on the headband 2. In this way, the two earpieces 3 are folded with their contact surfaces 7 toward to one another and the space underneath the headband 2 is used optimally. FIG. 5 shows clearly that, with a proper selection of the length of the headband 2 and of the arms 14, the position of the earpieces relative to one another in the folded state can be influenced.

Figure 6:
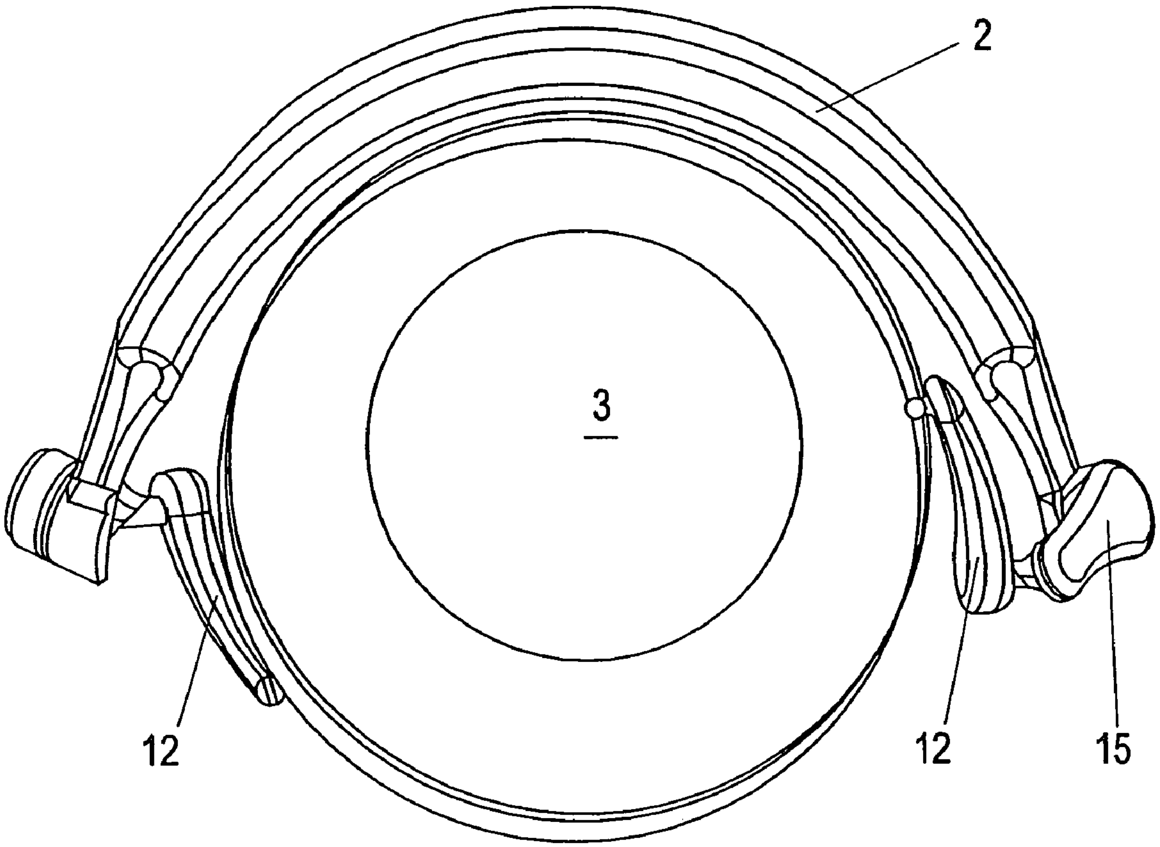
FIG. 6 is a variant similar to FIG. 5 shown only in a plan view.

A variant is illustrated in FIG. 6. The headphone 1 not only has the pivot axes R but also the pivot axes K1 and K2; with a proper selection of the dimensions, the earpieces 3 in the folded state are completely in a congruent position relative to one another; in this way, the greatest size reduction possible is achieved. This size reduction, as seen when comparing FIGS. 5 and 6, depends only on the position and orientation of the pivot axes R; the pivot axes K1 and K2 do not contribute anything in this respect.

While specific embodiments of the invention have been shown and described in detail to illustrate the inventive principles, it will be understood that the invention may be embodied otherwise without departing from such principles.

What is claimed is:

1. A headphone comprising:

a headband;

two earpieces each connected to the headband so as to be pivotable about at least two pivot axes, wherein the at least two pivot axes intersect one another at a point of intersection that is positioned on or near a central axis of the earpiece, wherein the at least two pivot axes are positioned at an angle of 5° to 75° relative to one another.

2. The headphone according to claim 1, wherein the point of intersection is positioned in an area of penetration of the central axis through a contact surface of the earpiece.

3. The headphone according to claim 1, wherein the angle is 10° to 20°.

4. The headphone according to claim 3, wherein the angle is approximately 15°.

5. The headphone according to claim 1, further comprising arms connecting the earpieces to the headband, wherein the arms define a first one of the at least two pivot axes, and wherein a second one of the at least two pivot axes is fixedly arranged on the headband, wherein the earpieces are rotatable about the arms and wherein the arms are rotatable relative to the headband about the second pivot axis.

6. The headphone according to claim 5, wherein the headband comprises support arms and wherein the second pivot axis is arranged on the support arms of the headband.

7. The headphone according to claim 6, wherein each support arm is rotatable about a pivot axis of the headband, wherein, when assuming a Cartesian coordinate system having a Z plane that is a symmetry plane of the headphone, having a Y plane that is positioned perpendicularly to the Z plane and extends through a center of the headband, and having an X plane that is positioned perpendicularly to the Z and Y planes at any desired height, the pivot axis of the headband is positioned at an angle of at least 10° relative to the X, Y and Z planes.

8. The headphone according to claim 7, wherein the angle is at least 15°.

* * * * *